United States Patent
Sair

[15] 3,635,726
[45] Jan. 18, 1972

[54] METHOD OF PRODUCING SOY PROTEIN CONCENTRATES

[72] Inventor: Louis Sair, Evergreen Park, Ill.
[73] Assignee: The Griffith Laboratories, Inc., Chicago, Ill.
[22] Filed: Sept. 20, 1968
[21] Appl. No.: 761,282

[52] U.S. Cl. ................................................. 99/17
[51] Int. Cl. ........................................... A23j 1/14
[58] Field of Search ...................... 99/14, 17, 98, 99

[56] References Cited

UNITED STATES PATENTS

| | | | |
|---|---|---|---|
| 2,284,700 | 6/1942 | Wahlfoss | 99/98 X |
| 2,881,076 | 4/1959 | Sair | 99/14 |

Primary Examiner—A. Louis Monacell
Assistant Examiner—William Andrew Simons
Attorney—Merriam, Marshall, Shapiro & Klose

[57] ABSTRACT

A method of producing or recovering improved, soy protein concentrate compositions, suitable for use in food products for humans, consisting essentially of an edible, nutritious, uniformly palatable, debittered, bland, proteinaceous composition free of undesired, characteristic beany taste or flavor, which involves combining (a) highly proteinaceous, soy protein isolate recovered from a liquid extract from an extraction of soybean material at a pH above the vicinity of the isoelectric pH of the glycinin content, with (b) fibrous residue recovered from said last-mentioned extraction, to produce an improved, soy protein concentrate.

12 Claims, No Drawings

METHOD OF PRODUCING SOY PROTEIN CONCENTRATES

This invention relates to improved, edible, nutritious, uniformly palatable, bland, debittered, particulate, soy protein concentrate compositions freed of undesired, characteristic beany taste or flavor. These improved, concentrate compositions are particularly useful in food products for humans. The present invention also relates to methods for preparing or recovering such improved, concentrate compositions.

Soybean materials, including flour or flakes, provide one of the cheapest and best sources of essential protein.

Soybean flour or flakes, for example, have been used in a limited manner in the preparation of ground meat products as a fat emulsifier and water-binding agent.

Defatted soybean grits (hulled, coarse grain soybean product), including those produced from soybean flakes, have also been mixed with ground meat products. Soybean grits constitute a very nutritional product containing about 50 percent by weight of protein. Soybean grits blend well with meat products, and when meat products having grits are cooked, the resulting products retain their desired character and as a result of this, the feel and texture of such products in the mouth are excellent. In many respects, soybean grits are an ideal extender to meat products, since the grits aid in retaining or binding the natural water of the meat and binds such products during cooking. When 5 pounds of soybean grits, for example, are added to 100 pounds of ground meat, one may add an additional 10 to 15 pounds of water and still have a very suitable, commercial meat patty from the standpoint of consistency and appearance.

One of the greatest obstacles to the general use in this country of soybean materials as a direct source of human food products, is the characteristic bitter beany taste or flavor; however, this has not presented as severe a restriction in Asiatic countries. A great amount of research has been conducted to try to eliminate this undesired characteristic, and many approaches have been used.

One approach involves the production of a soy protein isolate wherein soybean flakes are extracted or washed with a dilute aqueous alkaline solution. Following extraction, the flakes are subjected to centrifugation or screening to provide for the recovery of an insoluble, fibrous residue which is separated from the liquid, soy protein extract. The separated, fibrous residue has been used with other materials as animal feed. The liquid extract is subjected to an acid-precipitation step to produce a precipitated, soy protein isolate or cured having a pH of the order of about 4.5. The precipitated, isolate curd is subjected to a filtering or separation step which separates the soluble whey from the insoluble, isolate curd which may be in the form of a filter cake or wet mass. The isolate is washed and diluted with water, and neutralized. Alternatively, the soy protein isolate may be dried as such or in the neutralized form. The resulting soy protein isolate may contain, for example, about 90 percent by weight protein on a dry basis.

Another approach, as shown in U.S. Pat. No. 2,881,076, involves the adjustment of the pH of soybean materials to the vicinity of the isoelectric point, followed by extensive washing with water to remove retained beany taste or flavor conferring constituents and provide an outstanding, soy protein concentrate having a minimal level of undesired beany taste or flavor, odor and color.

More specifically, U.S. Pat. No. 2,881,076 describes an unobvious process for preparing or recovering an improved, soy protein concentrate which requires that soybean material, for example, in the form of deoiled or defatted flour or flakes, be subjected to the dissolving action of water having a pH in the vicinity of the isoelectric pH of the protein content of the soybean material, and that the insoluble solids in the form of an essentially insoluble slurry be separated from the resulting solution. The insoluble solids are then washed. The purpose of these steps is to remove undesired, characteristic beany taste or flavor, odor and color conferring ingredients. A preferred embodiment involves neutralizing the insoluble, soy protein material by adding an edible, alkaline agent to the insoluble protein slurry to raise its pH. The resulting concentrate slurry may be dried (e.g., spray dried).

By utilizing the process of U.S. Pat. No. 2,881,076, the soluble sugars and nitrogen-containing materials soluble in the vicinity of the isoelectric pH, and characteristic beany taste or flavor, odor and color conferring bodies are removed, which results in a soy protein concentrate product having a protein content, on a dry basis, of about 70 percent or higher. Such a concentrate product has a bland and debittered taste, light color, and when suspended in water, develops viscous dispersions having good emulsifying and water-binding properties.

The dried, bland, soy protein concentrate of U.S. Pat. No. 2,881,076 has met with great acceptance, has high protein content (e.g., about 70 to 73 percent by weight on a dry basis), and offers the combined and unobvious advantages of having been freed of undesired beany taste or flavor, odor and color conferring ingredients and having superior emulsifying and water-binding properties, particularly in emulsified meat products.

However, the soy protein concentrate of U.S. Pat. No. 2,881,076 has a very small residual level of beany taste or flavor which has restricted, to some degree, its use in bland, delicate foods for humans, such as milk products and desserts.

I have discovered that in producing a soy protein concentrate, more of the undesired, characteristic beany or chalky taste or flavor, beany odor and color conferring bodies are removed from soybean material by extracting the soybean material at a pH above the vicinity of the isoelectric pH of the glycinin content than results from extraction at a pH in the vicinity of the isoelectric pH of the glycinin content.

The extraction at a pH above the vicinity of the isoelectric pH of the glycinin content effectively removes undesired beany taste or flavor bodies, and in addition extracts desired, soluble protein. In this extraction, for example, about 35–38 percent by weight of the original soybean material is in a soluble form which can be recovered as soy protein isolate which is free of undesired beany taste or flavor bodies, and about 33–37 percent by weight of the original soybean material is insoluble and can be recovered as fibrous residue having polysaccharides and insoluble protein and which is likewise free of undesired beany taste or flavor bodies.

The soluble protein may be precipitated and ultimately recovered from the extract as soy protein isolate which is free of such undesired beany taste or flavor bodies, by reducing the pH of the extract to a pH in the vicinity of the isoelectric pH of the glycinin content.

Since the recovered fibrous residue and protein isolate, particularly when washed, are both free of the undesired, characteristic beany taste or flavor, I have found that they can be combined effectively and economically to produce an improved, soy protein concentrate.

Thus, the insoluble, fibrous residue which has been used heretofore in animal feed can be combined effectively, in desired proportions, with the more proteinaceous, insoluble, soy protein isolate, and the combined product may be neutralized to a pH within the range of from about 5.5 to 10.5, and dried, to provide an economical, improved, highly proteinaceous, soy protein concentrate suitable for human consumption that is free of undesired, characteristic beany or chalky taste or flavor, and beany odor and color.

My invention takes advantage of the fact that the soluble, liquid extract and/or wash resulting from (a) the extraction of soybean material at a pH above the vicinity of the isoelectric pH of the glycinin content, and (b) the precipitation of the soy protein isolate at a pH in the vicinity of the isoelectric pH of the glycinin content, includes and very effectively removes the undesired, characteristic beany or chalky taste or flavor, and beany odor and color conferring ingredients both from the recovered, fibrous residue and the soy protein isolate, respectively. This enables one to combine the fibrous residue with the soy protein isolate to provide economically an improved, edible, nutritious, uniformly palatable, bland, debittered, soy protein concentrate which is free of undesired, characteristic beany or chalky taste or flavor, and beany odor and color, and is suitable for use in food products for humans, including bland delicate desserts and milk products, as well as meat products, cereals, gravies, sauces, soups, baked goods, and the like.

The improved, edible, soy protein concentrates of this invention, when compared with a concentrate of U.S. Pat. No. 2,881,076, have substantially the same protein content, and, can provide outstanding emulsifying and water-binding properties. Further, the protein concentrate of this invention has less of the characteristic beany or chalky taste or flavor, and beany odor and color, which makes such concentrate products more suitable for use in foods for humans, including bland delicate foods. Still further, when the dried, soy protein concentrate of this invention is suspended in water, a more translucent product results and the insoluble hemicellulose has less of a tendency to settle upon standing.

Briefly, my invention contemplates a process whereby soybean protein materials (e.g., defatted or deoiled soybean material), including soybean flakes or flour, is extracted with water or water having alkaline material (e.g., sodium sulfite, sodium carbonate, caustic or sodium carbonate solution), so that the pH of the soy protein material is above the vicinity of the isoelectric pH of the glycinin content (i.e., pH of about 4 to 4.8), preferably at a pH of at least about 7. The use of an aqueous alkaline solution having sodium sulfite is particularly desired because the sulfite serves as an alkaline buffer and protein preservative. The liquid extract, which includes soluble protein and undesired, characteristic beany or chalky taste or flavor, and beany odor and color conferring ingredients, is removed or separated from the insoluble, fibrous residue. I prefer that the insoluble, precipitated, fibrous residue be subjected to additional extractions or washing with aqueous alkaline solution and/or water. At least part of any remaining liquid extract is removed from the fibrous residue by a centrifuging, screening, or filtering operation. The resulting washed, insoluble, fibrous residue has about 50 to 65 percent by weight protein on a dry basis.

The separated liquid extract from the initial extraction step at a pH above the vicinity of the isoelectric pH of the glycinin content of the soybean material, which has soluble protein, and, if desired, the liquid extract from the additional extractions or washing, is lowered or acidified (e.g., with acetic acid, hydrochloric acid, the combination of hydrochloric acid and sodium sulfite, sulfuric acid, sulfurous acid, and phosphoric acid) to a pH in the vicinity of the isoelectric pH of the glycincin content (i.e., pH of about 4 to 4.8). The characteristic beany or chalky taste or flavor, and beany odor and color conferring ingredients and soluble sugars and nitrogen-containing bodies are present in the resulting liquid whey, and the whey is removed from the resulting precipitated, soy isolate curd which contains glycinin protein. If desired, the precipitated isolate may be subjected to additional extractions or washing with an aqueous acidified solution and/or water. The separation and recovery of the protein isolate may be accomplished by centrifuging, screening or filtering operations. The recovered, wet, soy protein isolate curd contains, for example, about 90 to 97 percent by weight protein on a dry basis.

The resulting soybean protein isolate is then combined, in desired proportions, with the washed, insoluble, fibrous residue from the extraction of the soybean material at a pH above the vicinity of the isoelectric pH of the glycinin content to produce a wet, protein concentrate.

An edible, inorganic alkali or inorganic buffering agent or admixture (e.g., sodium carbonate, sodium bicarbonate, sodium hydroxide, disodium phosphate, trisodium phosphate, sodium tripolyphosphate, sodium tetrapyrophosphate, the analogous potassium phosphates, and ammonium hydroxide) is added to the soy protein concentrate material to raise ("neutralize") the pH of the concentrate to within the range of from about 5.5 to 10.5.

The resulting wet, neutralized, soy protein concentrate product, which may be in the form of dough, is then dried.

The drying operation can be accomplished, for example, by spray drying the wet concentrate, or by drying a thin layer of the wet concentrate while it is subjected to a vacuum.

If desired, the fibrous residue and/or soy protein isolate curd may be subdivided or comminuted in a wet state before they are combined to form the wet concentrate, or the concentrate may be subdivided before or after it is dried.

Although soybean flour and the like can be used in my process, there are economic advantages in using soybean flakes.

The resulting, essentially dry, particulate, highly proteinaceous concentrate composition has about 60 to 85 percent by weight protein on a dry basis, and is edible, uniformly palatable, bland, nutritious, debittered, and free of undesired, characteristic beany or chalky taste or flavor, and beany odor and color. The soy protein concentrate has outstanding emulsifying and water-binding characteristics, provided drying is conducted under conditions wherein substantial denaturing does not occur. When the soy protein is not to be used in meat products where emulsifying and water-binding characteristics is sought, denaturing of the protein may not be objectionable.

The following examples are for purposes of illustration only, and my invention is not necessarily limited thereto.

EXAMPLE 1

One-hundred g. of defatted soybean flakes were suspended in 500 ml. of water to which was added 0.5 g. of sodium sulfite. The pH of the slurry was adjusted with 50 percent by weight aqueous caustic soda to a pH of 8 and was agitated for 10 minutes, followed by the screening of the material through an 8 mesh screen. The flakes were washed on the screen with water and were then suspended in 500 ml. of water and again agitated for a few minutes, followed by screening and washing with water.

The solids content of the washed fibrous flakes or residue was 10.6 percent by weight and the flakes had a protein content of 6.2 percent by weight which on a dry basis was calculated as 58.3 percent by weight protein. The weight of the dry flakes on dry solids basis was 30.4 g. which was calculated as 33.8 percent by weight of the initial soybean flakes.

The liquor extracts from the screening steps were combined. Hydrochloric acid was added to the extract to adjust its pH to 4.2. The soy protein isolate curd was allowed to settle and the supernatant liquid whey was decanted off. This procedure was repeated two times to purify the soy protein isolate curd.

The solids content of the washed isolate curd was 6.4 percent by weight and the protein content was 5.7 percent by weight which is equivalent to 90 percent by weight protein. The weight of the protein curd was 500 g. which was calculated as 32 g. of solids, indicating 35.5 percent by weight of the starting soybean material was recovered in the protein curd fraction.

The discarded liquid whey from the process was combined to a total volume of 1,530 cc. The solids content was 1.41 percent by weight which was calculated as 21.4 g. of solids or 24 percent by weight of the starting soybean material.

The soy protein isolate curd and the washed soy protein flakes or residue were combined to form a soy protein concentrate. The concentrate was centrifuged, and the supernatant liquid was discarded.

The solids content of the recovered centrifuged concentrate material was 21.7 percent by weight and the protein content was 16.0 percent by weight which was calculated as 73.5 percent by weight protein on a dry basis in this fraction. The weight of the centrifuged concentrate material was 302.5 g. which was calculated as 65.5 g., indicating that in the combined fraction of the washed soy protein flakes and the washed soy protein isolate curd, 73 percent by weight of the starting soybean material was recovered in the concentrate.

The soy protein concentrate material from the centrifuge was then neutralized with a 10 percent aqueous sodium hydroxide solution to a pH of 6.5. The concentrate product had the appearance of a heavy sticky batter. It was placed on trays and dried at 130° F. under vacuum. As soon as the vacuum was pulled, the viscous material expanded to approximately fivefold its original volume. This expansion of the concentrate permitted rapid drying similar to foam drying.

The dried soy protein concentrate of this example was lighter and had less color than a dried soy protein concentrate made in accordance with U.S. Pat. No. 2,881,076. Water was added to separate portions of the dried soy protein concentrate material produced in this example and a dry soy protein concentrate made in accordance with U.S. Pat. No. 2,881,076, to provide 5 percent by weight concentrate samples that were tasted. The concentrate of this example had less of a beany or chalky taste or flavor. In addition, it was noted that when the dried soy protein concentrate product of this example was suspended in water, the resulting product was more translucent and there was less of a tendency of the insoluble hemicellulose to settle on standing, than when the dried, neutralized soy protein concentrate of U.S. Pat. No. 2,881,076 was suspended in water.

An analysis was made of the dried soy protein concentrate products made in accordance with this example and U.S. Pat. No. 2,881,076. The results obtained were as follows:

|  | Concentrate made in accordance with U.S. Patent No. 2,881,076 | Concentrate made in accordance with this example |
| --- | --- | --- |
| Nitrogen | 11.07% | 11.27% |
| Protein | 69.2% | 70.4% |
| Protein on a dry basis | 74.1% | 73.6% |
| Soluble nitrogen | 6.32% | 6.69% |
| Nitrogen soluble index | 53.3% | 56.8% |

EXAMPLE 2

One-hundred g. of defatted soy flakes were suspended in 600 ml. of water to which 0.5 g. of sodium bisulfite was added. 0.7 ml. of a 50 percent by weight of an aqueous caustic soda solution (50 percent caustic soda) was added to adjust the pH to 7.99. The slurry was agitated for 30 minutes.

The slurry was placed on a 12 mesh screen. The recovered insoluble fibrous soy protein flakes were washed with 100 ml. of water. An additional 400 ml. of water were added to the recovered insoluble flakes. The slurry was then screened again through the 12 mesh screen, and again washed with 100 ml. of water.

The analysis of the resulting recovered washed insoluble soy protein flakes or residue was as followed:

Washed Insoluble Soy Protein Flakes or Residue

| Weight of Wet Material | 276 g. |
| --- | --- |
| Solids | 12.2% |
| Protein (Dry Basis) | 62.4% |
| Weight of Washed Soy Flakes (Dry Basis) | 33.4 g. |
| Percentage Material From Soy Flakes | 36.8% |

The washed insoluble soy protein flakes or residue was slightly more than one-third of the weight of the starting defatted soybean flakes, and the extraction process removed protein and other ingredients. The finished washed soy flakes were still quite rich in protein content.

Nine-hundred fifty ml. of the proteinaceous liquor extract from the above extraction steps were collected. 4.85 ml. of 22 B. hydrochloric acid were added to the liquor to bring the pH down to 4.2. The soy protein isolate curd was allowed to settle to slightly less than half of the volume. The supernatant whey was decanted off, and the isolate was then brought back to the original volume following the same procedure. This process was repeated three times and then the settled protein isolate curd slurry was transferred to centrifuge tubes and centrifuged for 15 minutes at 2,500 r.p.m. The clear supernatant liquid was decanted off and added to the discarded liquid whey fraction. The analysis of the resulting insoluble soy protein isolate curd paste was as follows:

Insoluble Soy Protein Isolate Curd Paste

| Weight of Protein Paste | 112 g. |
| --- | --- |
| Solids | 30.3% |
| Protein Content of the Paste | 28.6% |
| Protein Content (Dry Basis) | 94% |
| Weight of the Protein Isolate (Dry Basis) | 33.6 g. |
| Percentage Material From Original Soybean Material | 37.6% |

The total volume of soy whey collected during the processing was 2,130 ml. and the solids content was 1.21 percent by weight which was calculated as 25.8 g. of solids in the whey which is equivalent to 28 percent by weight of the starting soybean material on a dry basis.

The washed soy protein flakes were combined with the pasty isolate curd and the resulting soy protein concentrate was mixed until substantially uniform.

The solids content of this concentrate blend was 16.7 percent by weight and the pH was 5.3. It required 2.5 ml. of 15 percent by weight of an aqueous caustic soda solution to bring the pH up to 6.7. The product became a very heavy doughlike mass. This material was then placed in a thin layer of about one-eighth to one-fourth in. thickness on an aluminum tray. The tray was then placed overnight in a vacuum oven at 136° F. As soon as the vacuum was pulled, it was noted that the volume of the paste increased or foamed to about five to tenfold its original volume.

A comparison of the soy protein concentrates made in accordance with this example and the dried, neutralized soy protein concentrate of U.S. Pat. No. 2,881,076 provided the following data:

|  | Concentrate made in accordance with U.S. Pat. No. 2,881,076 | Concentrate made in accordance with this example |
| --- | --- | --- |
| Moisture | 4.7% | 5.6% |
| Protein (dry basis) | 71.8% | 72.5% |
| Nitrogen soluble index | 53.3% | 59.3% |

Upon comparing the viscosity of the concentrate products made in accordance with this example and U.S. Pat. No. 2,881.067, it was found that the process of this example gave substantially higher viscosity which, of course, is very desirable where emulsification is sought. In making this comparison, 15 g. of each of these concentrate products were added to separate containers having 150 ml. of water, and the resulting products were placed in a Waring Blendor at low speed for 2 minutes. Time was allowed for the foam to break and the viscosity was determined using the Brookfield Viscometer. The results were as follows:

|  | Viscosity in Centiposes |
| --- | --- |
| Dried, Neutralized Soy Protein Concentrate Made in Accordance with U.S. Pat. No. 2,881,076 | 18 |
| Soy Protein Concentrate Made in Accordance with This Example | 75 |

It was also noted that the soy protein concentrate made in accordance with this example had definitely less beany taste or flavor than a concentrate made in accordance with U.S. Pat. No. 2,881,076. Six experienced tasters tasted the 5 percent by weight suspension of a soy protein concentrate made in accordance with this example and U.S. Pat. No. 2,881,076.

Five experienced tasters out of the six definitely noted the concentrate product made in accordance with U.S. Pat. No. 2,881,076 had a decidedly greater beany taste or flavor.

The forms of the invention herein shown and described are to be considered only as illustrative. It will become apparent to those skilled in the art that other modifications may be made therein without departure from the invention or scope of the appended claims.

I claim:

1. A method for producing or recovering an essentially dry, particulate, edible, nutritious, uniformly palatable, bland, debittered, soy protein concentrate suitable for use in food products for humans, which comprises extracting soybean material with a liquid extracting medium at a pH above the vicinity of the isoelectric pH of the glycinin content of said material to produce an insoluble, fibrous residue and a liquid extract having undesired soluble beany-taste-conferring bodies and soluble protein, separating the liquid extract from the fibrous residue, washing and recovering the resulting insoluble, fibrous residue free of undesired beany-taste-conferring bodies, lowering the pH of said liquid extract to a pH in the vicinity of the isoelectric pH of the glycinin content present therein to precipitate soy protein isolate and produce liquid whey having the undesired beany-taste-conferring bodies, recovering the precipitated protein isolate which is free of undesired beany-taste-conferring bodies, forming a neutralized mixture of a desired proportion of said recovered, fibrous residue and recovered, protein isolate to produce a soy protein concentrate, and drying the soy protein concentrate without substantially insolubilizing the protein, to produce said essentially dry, particulate, bland, soy protein concentrate free of undesired, characteristic beany taste and having a pH within the range of about 5.5 to 10.5.

2. The method of claim 1 wherein said drying is conducted under a vacuum while the wet, soy protein concentrate is in an expanded state.

3. The method of claim 1 wherein the concentrate is subdivided.

4. The method of claim 1 wherein said soy protein concentrate contains about 60–85 percent by weight protein on a dry basis.

5. A method for producing or recovering from soybean material an essentially dry, particulate, soy protein characterized by being an edible, nutritious, uniformly palatable, bland, debittered, soy protein concentrate free of undesired, characteristic beany or chalky taste or flavor, and beany odor and color, and suitable for use in food products for humans, which involves extracting soybean material with an aqueous extracting medium at a pH of at least about 7 to provide an insoluble, fibrous residue and a liquid extract having soluble protein and undesired, characteristic beany or chalky taste or flavor, and beany color and odor conferring bodies, separating the highly proteinaceous extract from the fibrous residue, washing and recovering the insoluble, fibrous residue which has about 50 to 60 percent by weight protein on a dry basis and is free of said undesired, characteristic bodies, reducing the pH of the separated liquid extract with an acidified, aqueous medium to a pH in the vicinity of the isoelectric pH of the glycinin content therein to precipitate insoluble, soy protein isolate curd from the liquid extract while the undesired, characteristic beany or chalky taste or flavor, and beany color and odor conferring bodies are in the resulting liquid whey in a soluble form, separating from the whey the precipitated, protein isolate curd, recovering the insoluble, protein isolate which is free of said undesired, characteristic bodies, combining insoluble, fibrous residue with insoluble, more proteinaceous, soy protein isolate to produce a wet, soy protein concentrate having about 60 to 85 percent by weight protein on a dry basis, adjusting the pH of the protein concentrate to a pH of about 5.5 to 10.5, and drying the wet protein concentrate without substantially insolubilizing the protein, to produce said essentially dry, particulate, bland, protein concentrate free of undesired, characteristic beany or chalky taste or flavor, and beany odor and color.

6. The method of claim 5 wherein the concentrate is subdivided.

7. The method of claim 5 wherein said drying is conducted under a vacuum while the wet soy protein concentrate is in an expanded state.

8. The method of claim 5 wherein about 35–37 percent by weight of the soybean material is recovered as said fibrous residue and about 35–38 percent by weight of the soybean material is recovered as said soy protein isolate.

9. A method for producing or recovering an essentially dry, particulate, edible, nutritious, uniformly palatable, bland, debittered, soy protein concentrate suitable for use in food products for humans, which comprises extracting soybean material with a liquid extracting medium at a pH above the vicinity of the isoelectric pH of the glycinin content of said material to produce an insoluble, fibrous residue and a liquid extract having undesired soluble beany-taste-conferring bodies and soluble protein, separating the liquid extract from the fibrous residue, washing and recovering the resulting insoluble, fibrous residue free of undesired beany-taste-conferring bodies, lowering the pH of said liquid extract to a pH in the vicinity of the isoelectric pH of the glycinin content present therein to precipitate soy protein isolate and produce liquid whey having the undesired beany-taste-conferring bodies, recovering the precipitated protein isolate which is free of undesired beany-taste-conferring bodies, combining a desired proportion of said recovered, fibrous residue and recovered, protein isolate to produce a wet soy protein concentrate, raising the pH of the protein concentrate to a pH of about 5.5 to 10.5 if the pH thereof is not already in that range, and drying the wet, soy protein concentrate without substantially insolubilizing the protein, to produce said essentially dry, particulate, bland, soy protein concentrate free of undesired, particulate beany taste.

10. The method of claim 9 wherein said drying is conducted under a vacuum while the wet, soy protein concentrate is in an expanded state.

11. The method of claim 9 wherein the concentrate is subdivided.

12. The method of claim 9 wherein said soy protein concentrate contains about 60–85 percent by weight protein on a dry basis.

* * * * *